US010330116B2

(12) United States Patent
Bylund et al.

(10) Patent No.: US 10,330,116 B2
(45) Date of Patent: Jun. 25, 2019

(54) NOISE REDUCTION SYSTEM FOR A BLOWER

(71) Applicant: HUSQVARNA AB, Huskvarna (SE)

(72) Inventors: Christian Bylund, Huskvarna (SE);
Pär Martinsson, Jönköping (SE);
Tobias Nyberg, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 286 days.

(21) Appl. No.: 15/305,851

(22) PCT Filed: Apr. 24, 2014

(86) PCT No.: PCT/EP2014/058370
§ 371 (c)(1),
(2) Date: Oct. 21, 2016

(87) PCT Pub. No.: WO2015/161883
PCT Pub. Date: Oct. 29, 2015

(65) Prior Publication Data
US 2017/0045058 A1 Feb. 16, 2017

(51) Int. Cl.
A47L 5/14 (2006.01)
A01G 20/47 (2018.01)
F04D 25/06 (2006.01)
F04D 29/52 (2006.01)
F04D 29/70 (2006.01)
(Continued)

(52) U.S. Cl.
CPC ........... F04D 29/522 (2013.01); A01G 20/47 (2018.02); F04D 25/0606 (2013.01); F04D 25/0673 (2013.01); F04D 25/084 (2013.01); F04D 29/661 (2013.01); F04D 29/703 (2013.01); A47L 5/14 (2013.01)

(58) Field of Classification Search
CPC .. F04D 29/522; F04D 29/661; F04D 25/0673; F04D 25/084; F04D 25/0606; F04D 29/703; A01G 20/47; A47L 5/14
USPC .................................................... 15/344, 405
See application file for complete search history.

(56) References Cited

U.S. PATENT DOCUMENTS 3,045,578 A    7/1962  McGrath
5,979,013 A   11/1999  Beckey et al.
(Continued)

FOREIGN PATENT DOCUMENTS

CN    101122121 A    2/2008
CN    101255681 A    9/2008

OTHER PUBLICATIONS

International Search Report and Written Opinion for International Application No. PCT/EP2014/058370 dated Dec. 12, 2014, all enclosed pages cited.
(Continued)

Primary Examiner — David Redding
(74) Attorney, Agent, or Firm — Burr Forman McNair

(57) ABSTRACT

A blower may include a housing, a motor, a fan assembly and an aperture array. The housing may include a handle portion, a top wall and a bottom wall. The fan assembly may be operably coupled to the motor to force air through a blower tube responsive to operation of the motor. The blower tube may define a tube axis. The aperture array may be provided at a portion of the housing to provide a path for air to the fan assembly. The aperture array may be defined by a plurality of vanes disposed at a portion of the housing between the top wall and the bottom wall. The vanes may be angled downward relative to the handle portion.

20 Claims, 8 Drawing Sheets

(51) Int. Cl.
 *F04D 25/08* (2006.01)
 *F04D 29/66* (2006.01)

(56) References Cited

U.S. PATENT DOCUMENTS

| | | |
|---|---|---|
| 2001/0005482 A1 | 6/2001 | Wolpert |
| 2008/0189903 A1 | 8/2008 | Schliemann |
| 2009/0271945 A1 | 11/2009 | Ludwigson |
| 2010/0074738 A1 | 3/2010 | Yoshizaki et al. |
| 2012/0073080 A1 | 3/2012 | Yokoyama |
| 2012/0076672 A1 | 3/2012 | Binder |

OTHER PUBLICATIONS

International Preliminary Report on Patentability for International Application No. PCT/EP2014/058370 dated Oct. 26, 2016, all enclosed pages cited.

NOISE REDUCTION SYSTEM FOR A BLOWER

TECHNICAL FIELD

Example embodiments generally relate to outdoor power equipment and, more particularly, relate to a structure for reducing the noise generated by power equipment such as a blower.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be handheld, size and weight become important considerations. In some applications, the emissions (i.e., in terms of noise and/or pollutants) generated by the device may also become an important consideration. To reduce emissions, such outdoor power equipment may be selected for employment with electric motors. However, even the fan assemblies of some electric powered outdoor power equipment such as blowers may be capable of generating relatively large amounts of noise.

Although it may always be advisable to wear hearing protection while operating outdoor power equipment, some operators will still operate the equipment without hearing protection. Additionally, the provision of equipment that is quieter can be a very positive marketing incentive. Thus, to improve operating conditions for operators and for people in the vicinity of working equipment, it may instead be desirable to provide design features that enable the equipment to operate more quietly.

BRIEF SUMMARY OF SOME EXAMPLES

Some example embodiments may therefore provide structures that facilitate a reduction in the noise that is perceptible to operators and others in the vicinity of operating equipment. Moreover, some embodiments may provide improvements without the addition of extra components or structures that may increase the size, cost and/or complexity of outdoor power equipment.

In accordance with an example embodiment, a blower may be provided. The blower may include a housing, a motor, a fan assembly and an aperture. The housing may include a handle portion, a top wall and a bottom wall. The fan assembly may be operably coupled to the motor to force air through a blower tube responsive to operation of the motor. The blower tube may define a tube axis. The aperture array may be provided at a portion of the housing to provide a path for air to the fan assembly. The aperture array may be defined by a plurality of vanes disposed at a portion of the housing between the top wall and the bottom wall. The vanes may be angled downward relative to the handle portion.

In another example embodiment, an aperture array for a blower may be provided. The blower may include a housing, a motor, and a fan assembly. The housing may include a handle portion, a top wall and a bottom wall. The fan assembly may be operably coupled to the motor to force air through a blower tube along a tube axis responsive to operation of the motor. The aperture array may be provided at a portion of the housing to provide a path for air to the fan assembly. The aperture array may include a plurality of vanes disposed at a portion of the housing between the top wall and the bottom wall. The vanes may be angled downward relative to the handle portion.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
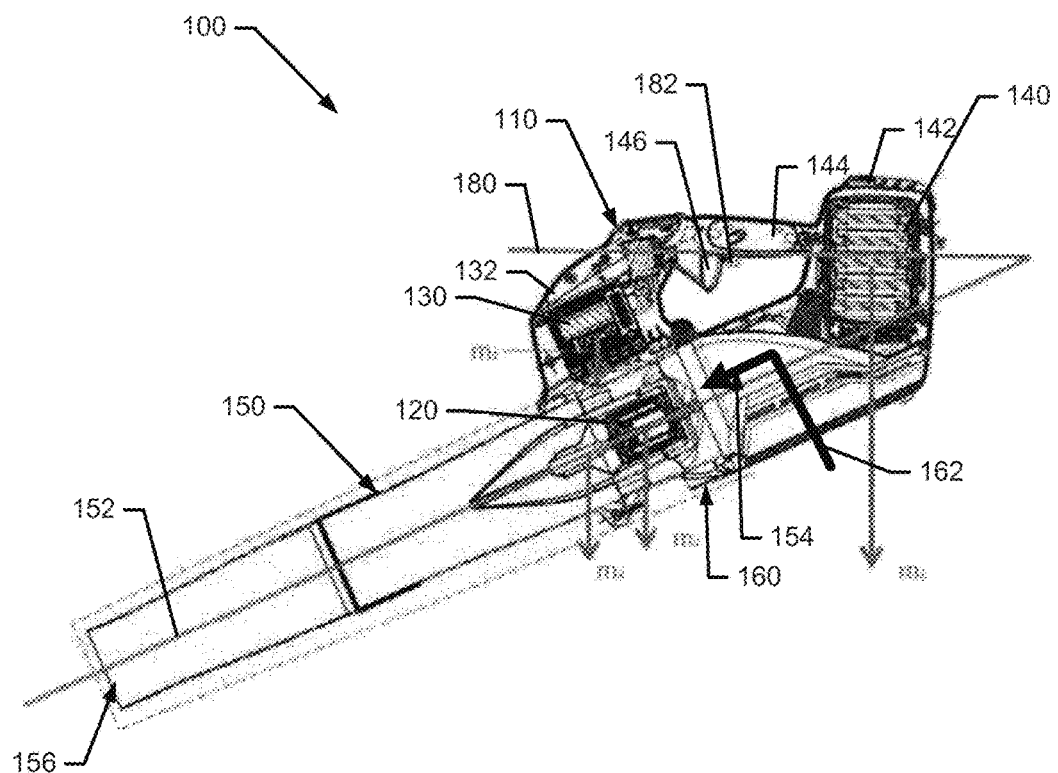
FIG. 1A illustrates a cross sectional side view of a blower in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide structures for providing air to the blower in a manner that tends to reduce the noise generated by the blower. In this regard, some example embodiments may provide for the inclusion of inlet vanes on the side portions of the blower housing, where the inlet vanes are angled downward. By angling the inlet vanes downward, noise that emanates from the fan assembly of the device is also generally directed downward. Since the operator tends to naturally hold the device at or around waist level (often below waist level), the directing of noise downward by the angled inlet vanes correspondingly directs the noise away from the operators ears and toward the ground. Directing the noise toward the ground may prevent the noise from having a direct path to the operator's ears, but it may also direct the noise to the rough and somewhat sound absorptive terrain below so that noise can be absorbed and/or reflected to reduce overall noise levels in the environment as well.

Of course, one might assume that downward direction of the noise could alternatively be achieved by placing the inlet vanes at a bottom portion of the blower (rather than on sides of the blower). However, the blower may be stored on its bottom and/or rested on its bottom between uses. If the blower is set down on the ground or on some other surface that is not clean, the inlet vanes could be penetrated and/or plugged by dirt or other debris that could reduce the effectiveness of the blower or even damage fan assembly components. Thus, placement of the inlet vanes on the side, with downward angling, provides for noise reduction without rendering the blower susceptible to undesirable effects. The quietness of the blower may therefore be improved with reduced cost and complexity while still increasing blower reliability.

Figure 1B:
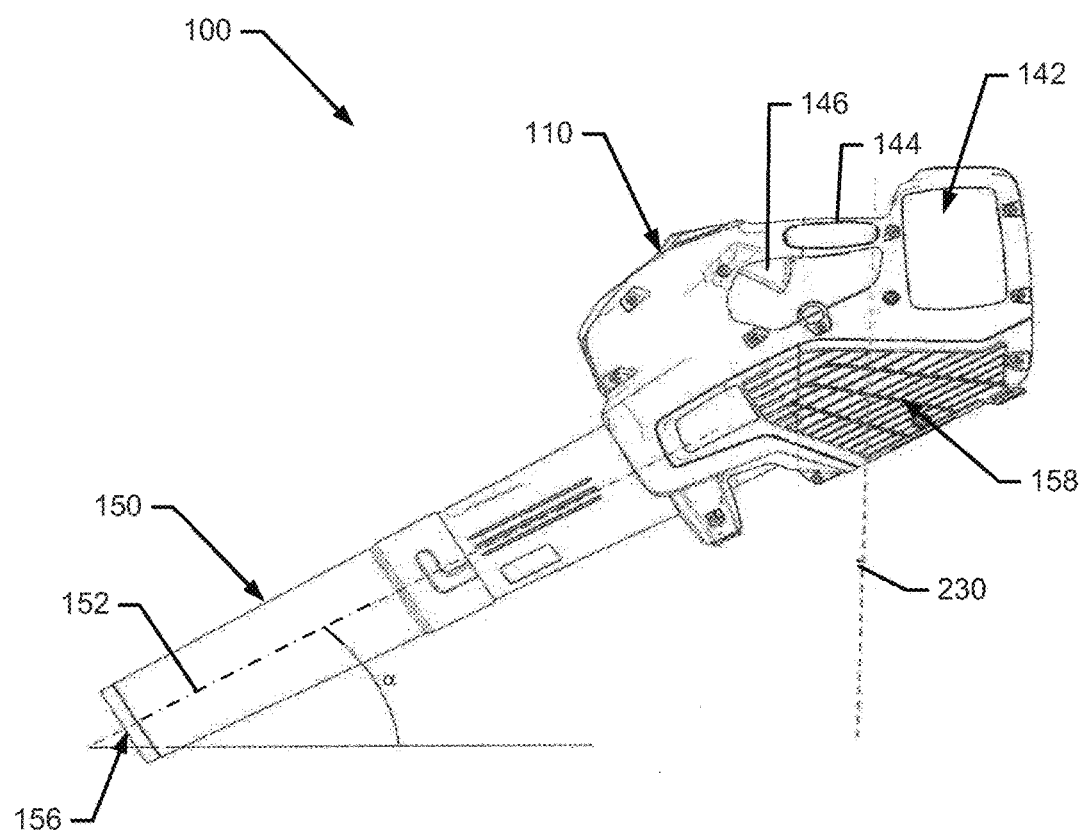
FIG. 1B, illustrates a corresponding side view of the blower in accordance with an example embodiment.
Figure 2:
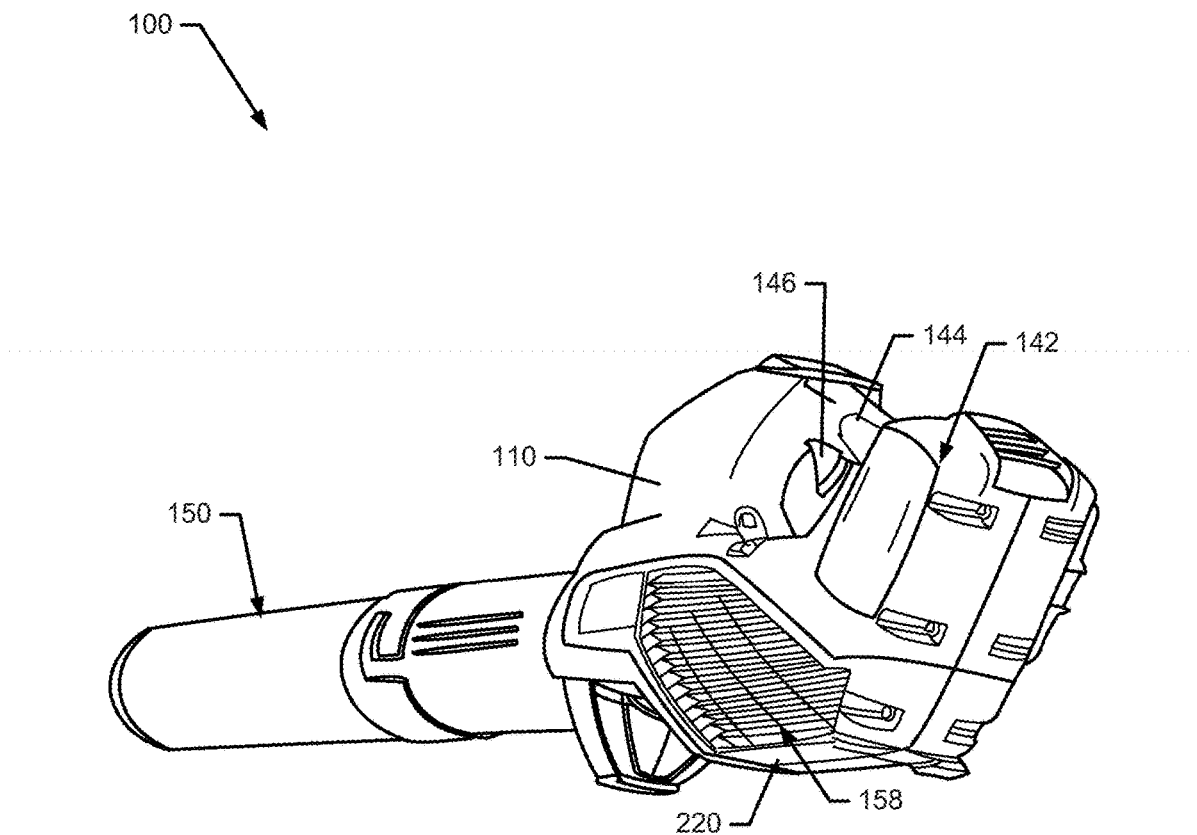
FIG. 2 illustrates a perspective side view of a blower to show some structures for providing noise reduction in accordance with an example embodiment in accordance with an example embodiment.

FIG. 1, which includes FIGS. 1A and 1B, illustrates a cross sectional view (FIG. 1A) of a blower 100 taken along a longitudinal centerline of the blower 100 and a corresponding side view (FIG. 1B) in accordance with an example embodiment. FIG. 2 illustrates a perspective side view of the blower 100 in accordance with an example embodiment. It should be appreciated that the blower 100 of FIGS. 1 and 2 merely represents one example of power equipment on which an example embodiment may be employed. Referring to FIG. 1, the blower 100 may include a housing 110 inside which various components of the blower 100 are housed. The blower 100 may further include a motor 120 or power unit for providing the driving force to move air through the blower 100. In some embodiments, the power unit may be a three phase electric motor that is operated under the control of a control unit 130 or control circuitry and powered by a battery 140 or battery adaptor. However, a DC motor could be used in some embodiments as well.

The housing 110 may be formed of plastic, composite materials, metals or any other desirable materials. In an example embodiment, the housing 110 may be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces.

In some embodiments, the control unit 130 may be housed in its own portion of the housing 110. The portion of the housing 110 in which the control unit 130 is housed may be referred to as a control unit housing portion 132, and the control unit housing portion 132 may be an integral part of a half-shell (as described above) or may be a separate housing portion that is joined to other housing portions. The control unit housing portion 132 may be disposed proximate to a portion of the housing 110 near which the motor 120 is provided.

In an example embodiment, the battery 140 may be housed in a battery compartment 142 that may be disposed at a rear portion of the housing 110, separated from the control unit housing portion 132 by a handle 144. The handle 144 may include a trigger 146 that may be operated by a finger of the operator while the operator holds the handle 144. Actuation of the trigger 146 may cause power from the battery 140 to be selectively applied to the motor 120 to turn the motor 120 based on control provided by the control unit 130. In some cases, the control unit 130 may include interlocks, protective functions or other control mechanisms that may sense various conditions of the blower 100 via sensors, switches or other mechanisms in order to selectively control the application of power to the motor 120 based on indications of user intent (e.g., via actuation of the trigger 146) and/or determinations regarding the state of the blower 100 as provided by the sensors, switches or other mechanisms.

It should be appreciated that although FIG. 1 shows an example in which the trigger 146 is used for selective powering of the motor 120, other example embodiments may employ a selector, switch, button or other such operative member in order to selectively control operation of the motor 120. Thus, for example, on/off, speed control or other operable functions for controlling the motor 120 may be performed using an operative member of any desirable form, and the trigger 146 is just one example. Some embodiments could also user other power sources instead of the battery 140.

The blower 100 may further include a blower tube 150 that is attached to housing 110 (or is a part of the housing 110) and through which air may be expelled. The blower tube 150 may define a blower tube axis 152, which defines an axial centerline of the blower tube 150. The blower tube 150 may include an inlet portion 154 and an outlet 156. The outlet 156 may be at a distal end of the blower tube 150 and the inlet portion 154 may be at an opposite end of the blower tube 150 proximate to the motor 120 and the battery 140.

In an example embodiment, the inlet portion 154 may be disposed proximate to an aperture array including louvers, vanes, guide holes or other such apertures formed in the housing 110 to enable air to enter into the blower tube 150 responsive to operation of the motor 120 to be expelled via the outlet 156. In this regard, the operation of the motor 120 may cause an impeller or fan assembly 160 to rotate so that a low pressure area is generated to draw air into the inlet portion 154 through the aperture array 158 to be passed through the fan assembly 160 and expelled from the blower tube 150 at the outlet 156 to blow leaves, debris, or any other material.

In some cases, as shown in FIG. 1, the motor 120 and the fan assembly 160 may each be coaxial with the blower tube axis 152, so that air exiting the fan assembly 160 is generally moved (although such flow may be turbulent) along a direction substantially parallel to the blower tube axis 152. However, air entering into the inlet portion 154 is generally drawn in at an angle relative to the blower tube axis 152. In some cases, the angle may be about 90 degrees as shown by arrow 162 in FIG. 1. However, the angle could be an obtuse angle in some embodiments. As such, the air entering into the blower tube 150 (i.e., inlet air) may undergo a direction change relative to the direction such air takes through the fan assembly 160 and/or through the blower tube 150 as the air approaches the outlet 156 (i.e., as outlet air). In some cases, the louvers, vanes, guide holes or other such apertures formed in the housing 110 to embody the aperture array 158 may be strategically located to reduce the ability of noise from the motor 120 or airflow in the blower tube 150 from transmitting up to the operator's ears. Moreover, the louvers, vanes, guide holes or other such apertures of the aperture array 158 may be formed on each respective side portion of the housing 110 as shown in FIG. 1.

In an example embodiment, the battery compartment 142 may be disposed at a rearward most end of the housing 110, which may be above or even rearward of the inlet portion 154. Meanwhile, the control unit housing portion 132 may be disposed proximate to the motor 120 outside of the blower tube 150. Thus, in reference to FIG. 1, the battery 140 is located at a rear of the blower 100 and the outlet 156 is at the front of the blower 100. The handle 144 is generally held by the operator in a manner that places the handle 144 at the top with the motor 120 suspended below the handle 144. With these relative positions identified for reference, it can be appreciated that the half of the housing 110 that is removed in FIG. 1A is the left half, and thus the right half of the housing 110 remains.

As shown in FIG. 1, the blower 100 may be designed for balance and optimal ergonomics while being operated. As such, the handle 144 is generally designed to extend substantially horizontal to the ground plane while the operator holds the blower 100 in a natural or comfortable grip as shown by line 180, which is parallel to the ground plane. Meanwhile, the blower tube axis 152 lies at an angle α relative to line 180 and the ground plane. The angle α may be between 15 degrees and 35 degrees in some embodiments, and could be selected based on balancing the centers of mass of the various components of the blower 100, while also generating a natural downward cant angle that generally points the outlet 156 toward the ground when the blower 100 is held in its most comfortable and natural position by the operator.

FIG. 1 shows example vectors indicative of the masses of various components of the blower 100. In this regard, $m_1$ represents the center of mass of the battery 140, which is relatively heavy and located at a rear portion of the blower 100, closest to the intersection of the blower tube axis 152 and line 180. Meanwhile, $m_2$ represents the smaller center of mass of the motor 120 and $m_3$ represents the center of mass of the control unit 130. When held at the handle 144, the "x" shape 182 represents a point about which the various centers of mass of the blower 100 are balanced. Thus, $m_4$ represents the center of mass of the fan assembly 160, which lies forward of the handle 144, along with the centers of mass of the motor 120 and the control unit 130 to counter the larger weight of the battery 140. Providing the handle 144 at an angle relative to the blower tube axis 152, and distributing the masses as provided in FIG. 1 causes the blower 100 to have a natural downward cant angle when held in its ergonomically optimized, balanced condition. The natural downward cant angle may be between about 5 degrees and 55 degrees. In some cases, the natural downward cant angle may be about 25 degrees.

As discussed above, the motor 120, the battery 140 and the control unit 130 may generate heat while in use. Accordingly, to reduce the risk of overheating these components, and maximize the reliability of the blower 100, these components should be effectively cooled. An example embodiment may therefore be provided with various airflow directing structures to facilitate cooling of these components. FIG. 2 illustrates some of these structures in accordance with an example embodiment.

Figure 3:
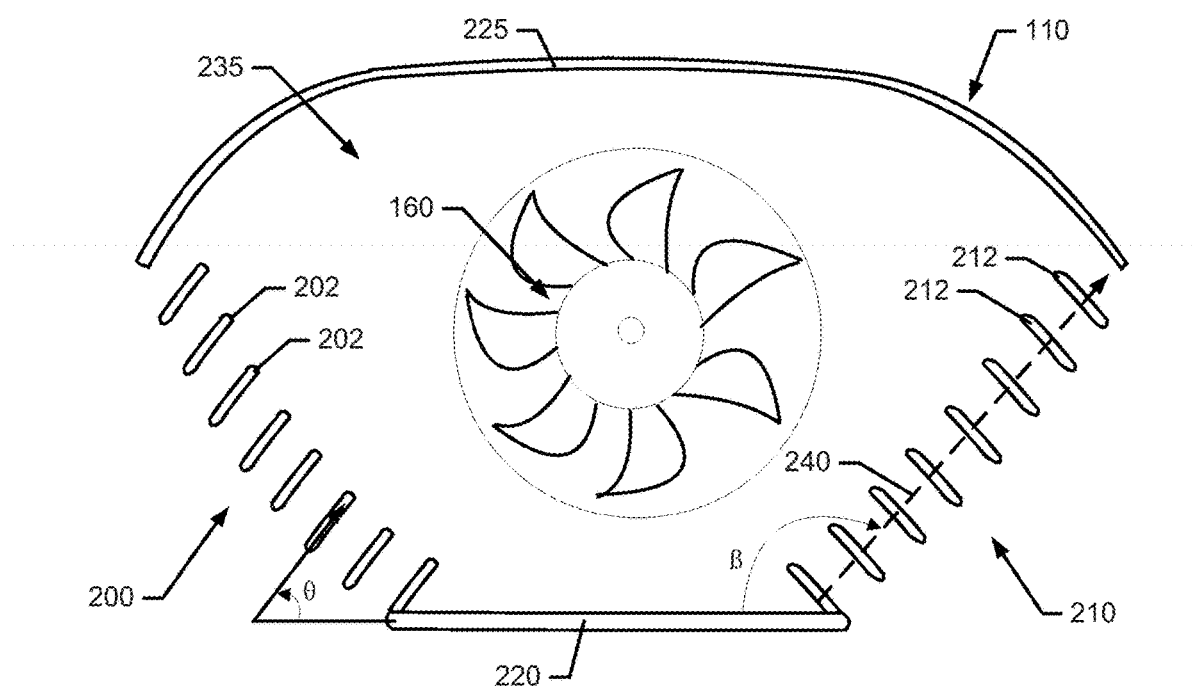
FIG. 3 illustrates a cross section view of an area of a blower through which air enters via an aperture array in accordance with an example embodiment.

As shown in FIGS. 2 and 3, the louvers, vanes, guide holes or other such apertures of the aperture array 158 may be formed on each respective side portion of the housing 110 as shown in FIG. 1. As such, the aperture array 158 may define at least a portion of the sidewalls of the housing 110. In particular, relative to the normal operating position of the blower 100 in which the handle 144 is generally held and the device naturally suspends from the handle 144 to define the angle α as described above so that the handle 144 is oriented toward a top of the blower 100, the aperture array 158 may include a first array 200 and a second array 210 that are disposed on right and left sides of the blower 100. Meanwhile, the first and second arrays 200 and 210 are separated from each other by a bottom wall 220 of the housing 110 in the vicinity of the bottom of the blower 100, and by a top wall 225 of the housing 110 in the vicinity of the top of the blower 100. The bottom wall 220 and top wall 225 may each, in some cases, be a rigid plastic housing portion that does not have any substantial gaps holes or other apertures through which air may be ingested into the fan assembly 160 (except perhaps at a seam that may be formed at or near a longitudinal midpoint of the bottom wall 220 and top wall 225). As such, air may generally be drawn into the fan assembly 160 via the aperture array 158 on the sidewalls of the housing 110 and not via the bottom of the housing 110.

In an example embodiment, the first and second arrays 200 and 210 may be formed by vanes that extend longitudinally in a direction that is substantially parallel to the tube axis 152. The first and second arrays 200 and 210 may extend from a portion of the housing 110 that is below the handle to a portion of the housing 110 that is below the battery compartment 142 along the bottom wall 220. In this regard, FIG. 1B shows a line 230 extending substantially perpendicular to the longitudinal extension of the handle 144 to intersect the bottom wall 220. As can be appreciated from FIG. 1B, the bottom wall 220 may begin extending rearward from a point substantially directly below a rear end of the handle 144 (i.e., where the handle 144 intersects the battery compartment 142) when the handle 144 is held substantially parallel to the ground. The bottom wall 220 may extend substantially to the rear end of the housing 110. Meanwhile, a bottom portion of the first and second arrays 200 and 210 may extend along the bottom wall 220 substantially parallel to the tube axis 152. In some cases, the respective lateral ends of the first and second arrays 200 and 210 may be formed by the corresponding longitudinal ends of individual vanes 202 and 212, respectively. The lateral ends of the first and second arrays 200 and 210 may extend at an angle relative to the tube axis 152 and the top portion of the first and second arrays 200 and 210 may extend substantially parallel to the tube axis 152 and to the bottom portion of the first and second arrays 200 and 210.

FIG. 3 illustrates a cross section view of the housing 110 taken along line 230 and passing through a mixing area 235 in which air entering the blower 100 through the aperture array 158 is mixed prior to being forced through the blower tube 150 by operation of the fan assembly 160. As shown in FIG. 3, the individual vanes 202 and 212 of the first and second arrays 200 and 210, respectively, may be formed at an angle relative to the transverse direction of extension of the bottom portion 220. As such, while the longitudinal lengths of the individual vanes 202 and 212 may extend substantially parallel to the tube axis 152, the transverse direction of extension of the individual vanes 202 and 212 (shown by arrow 204 and 214, respectively, in FIG. 3) may form an angle θ relative to the bottom portion 220. Of note, the angle θ is measured relative to a plane in which the bottom portion 220 lies and generally measures the angle of the vanes 202 and 212 relative to the plane of the bottom portion 220 as the vanes 202 and 212 extend transversely from an interior portion of the vanes 202 and 212 to an exterior portion of the vanes 202 and 212.

In an example embodiment, the transverse lengths of the vanes 202 and 212 of each respective array (e.g., 200 and 210, respectively) may extend substantially parallel to each other. In some cases, the widths of the individual vanes 202 and 212 may be relatively small in comparison to the length of the individual vanes 202 and 212 in the transverse direction of extension. Although shown to be relatively flat shaped in FIG. 3, it should be appreciated that the vanes 202 and 212 could have different shapes such as being tapered at one or both transverse ends. However, in any case, by forming the individual vanes 202 and 212 at the angle θ relative to the bottom portion 220, sound may generally be directed downward as shown by arrows 206 and 216, respectively.

The mixing area 235 may be defined, in a vertical direction (relative to the normal orientation of the blower 100 during use), between the top wall 225 and the bottom wall 220 and, in a horizontal direction, between the first and second arrays 200 and 210. Front and As such, the first and second arrays 200 and 210 may effectively form sidewalls of the mixing area 235, though such sidewalls are provided with downwardly angled gaps, by design. In some embodiments, each of the individual vanes 202 and 212 of the respective first and second arrays 200 and 210 may lie in a same plane. For example, the individual vanes 212 that form the second array 210 may lie in a plane that passes through line 240 and extends along the longitudinal length of the individual vanes 212. As such, the line 240 may pass through a midpoint or other common point of each of the individual vanes. The plane may form an angle ß relative to the bottom wall 220.

Figure 4:
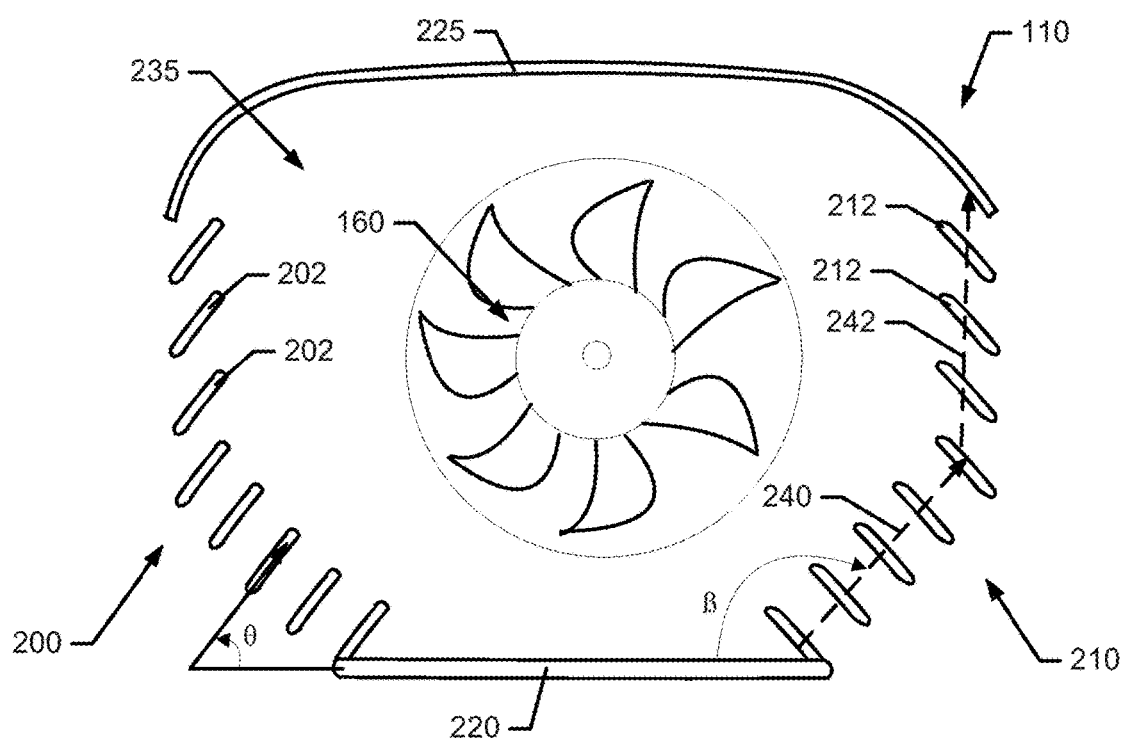
FIG. 4 illustrates a cross section view of an alternative design to that of FIG. 3 in accordance with an example embodiment.
Figure 5:
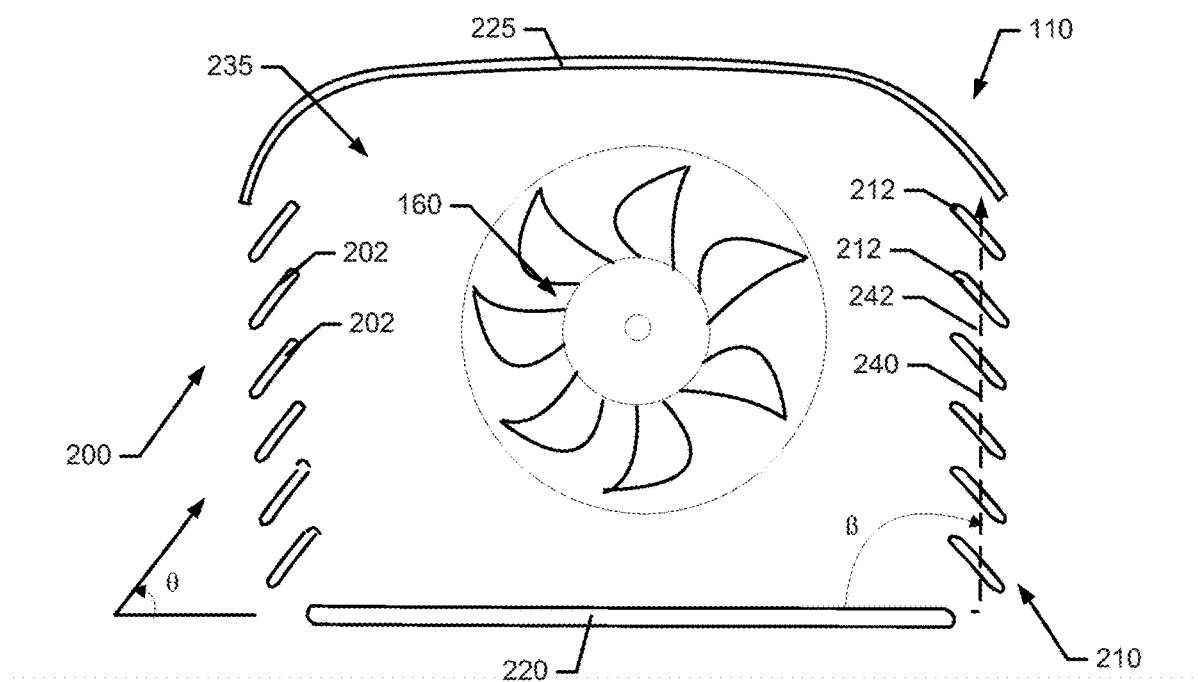
FIG. 5 illustrates a cross section view of still another alternative design to that of FIGS. 3 and 4 in which the sidewall takes a different angle relative to the bottom wall in accordance with an example embodiment.
Figure 6:
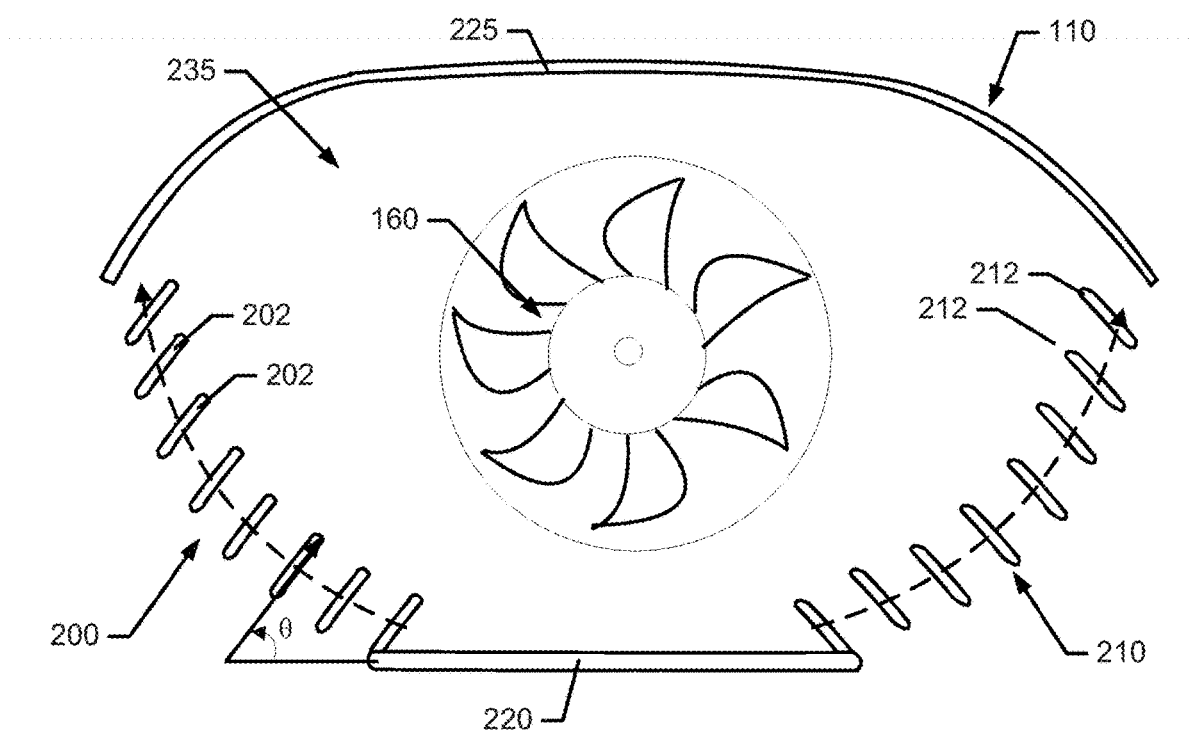
FIG. 6 illustrates yet another example embodiment in which vanes of each respective array are arranged such that longitudinal lengths of the vanes are spaced apart from each other to form a convex shape in accordance with an example embodiment.

Although the individual vanes 202 and 212 of the respective first and second arrays 200 and 210 of some embodiments may be arranged to be substantially in a same plane (as shown in FIG. 3), the individual vanes 202 and 212 need not necessarily all be arranged in the same plane. For example, in some cases, a first group of the individual vanes 212 may be arranged such that a plane passing through line 240 and the arrangement may then be bent out of the plane to form another plane (or curved shape). As such, in some embodiments, at least a portion of the vanes 212 (e.g., a second group of the individual vanes 212) may be extend away from the bottom wall (220) and not lie in the plane represented by line 240. FIG. 4 illustrates an alternative example in which a second plane (represented by line 242) bisects the second group of individual vanes 212. Meanwhile, FIG. 5 illustrates another alternative embodiment in which the sidewalls of the blower 100 are substantially at a right angle relative to the bottom wall 220. As such, the angle ß is about 90 degrees in the example of FIG. 5. FIG. 6 illustrates yet another example embodiment in which the vanes 202 and 212 of each respective array (200/210) are arranged such that the longitudinal lengths of the vanes 202 and 212 are spaced apart from each other to form a convex shape. It should also be appreciated that combinations of the examples of FIGS. 3-6 are also possible (e.g., planar and convex portions with various different angles).

As may be appreciated from FIGS. 1-6, air entering into the mixing area 235 undergoes a direction change while entering into the blower 100. In this regard, the blower 100 is provided with the individual vanes 202 and 212 of the respective first and second arrays 200 and 210 angled downward so that air must enter at an upward angle or trajectory. The air then changes direction as it heads into the airstream that enters the fan assembly 160. The downward angling of the individual vanes 202 and 212 provides mitigation of noise levels experienced by the operator. However, the fact that the air is not simply drawn in through the bottom wall 220 means that the blower 100 is not susceptible to drawing in foreign objects, dust and debris, as would be the case if the bottom wall 220 were simply provided with the aperture array 158.

Figure 7:
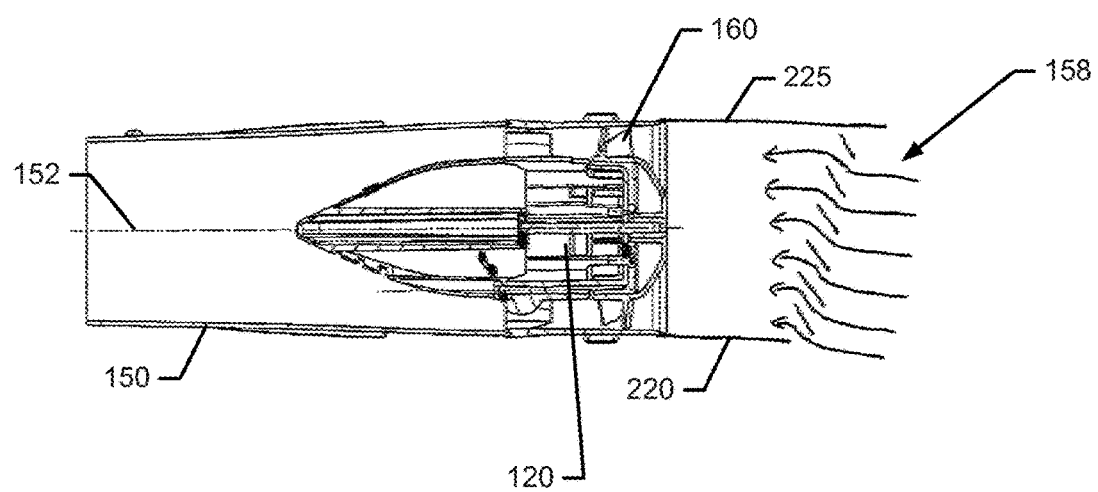
FIG. 7 illustrates a cross section view of still another alternative design in accordance with an example embodiment.

It should be appreciated that although the examples of FIGS. 1-6 show the aperture array 158 being provided on left side and right side walls, it may also be possible to duplicate the desired effects by providing the aperture array 158 on a back side wall as well. Thus, FIG. 7 is provided as an example of such an embodiment. FIG. 7 illustrates an alternative blower structure in which the aperture array 158 is provided on the back side wall. As shown in FIG. 7, the bottom wall 220 may still be provided to prevent dust, debris and other foreign objects from being drawn into the fan assembly 160. However, the aperture array 158 still includes downwardly angled vanes that can mitigate noise production issues.

A blower of an example embodiment may therefore include a housing, a motor, a fan assembly and an aperture array. The housing may include a handle portion, a top wall and a bottom wall. The fan assembly may be operably coupled to the motor to force air through a blower tube responsive to operation of the motor. The blower tube may define a tube axis. The aperture array may be provided at a portion of the housing to provide a path for air to the fan assembly. The aperture array may be defined by a plurality of vanes disposed at a portion of the housing between the top wall and the bottom wall. The vanes may be angled downward relative to the handle portion.

The blower (or aperture array) of some embodiments may include additional features that may be optionally added either alone or in combination with each other. For example, in some embodiments, (1) the vanes may be provided in a first array disposed on one sidewall of the housing and a second array disposed on another sidewall of the housing. In some cases, (2) the first and second arrays may be disposed on opposite sides of the bottom wall. In an example embodiment, (3) the vanes may extend along a direction substantially parallel to the tube axis. In some examples, (4) the vanes may be arranged parallel to each other in an array that extends away from the bottom wall in a plane that forms an angle relative to the bottom wall. In some embodiments, (5) the array may include at least one portion separated from the bottom wall in which the vanes are not in the plane. In some cases, (6) the vanes may be arranged such that longitudinal lengths of each of the vanes in a corresponding array are parallel to each other, and the vanes in the corresponding array may be further arranged such that transverse lengths of each of the vanes are substantially parallel to each other. In an example embodiment, (8) the longitudinal lengths of the vanes may be arranged spaced apart from each other to form a convex shape extending away from the bottom wall.

In some embodiments, any or all of (1) to (8) may be employed in addition to the optional modifications or augmentations described below. For example, in some embodiments, the aperture array may be disposed below the handle portion. Additionally or alternatively, a mixing area may be formed in an area between the aperture array, the top wall, the bottom wall, a battery compartment and the fan assembly. In such an example, access to the mixing area may be provided via lateral air intake. Additionally or alternatively, the vanes may be arranged such that a transverse length of the vanes may be oriented relative to a plane of the bottom wall to define an angle between about 45 degrees and 80 degrees.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A blower comprising:
a housing including a handle portion, a top wall and a bottom wall;
a motor;
a fan assembly operably coupled to the motor to force air through a blower tube responsive to operation of the motor, the blower tube defining a tube axis;
an aperture array provided at a portion of the housing to provide a path for air to the fan assembly, the aperture array being defined by a plurality of vanes disposed at a portion of the housing between the top wall and the bottom wall, the vanes being angled downward relative to the handle portion; and
a mixing area formed in an area between the aperture array, the top wall, the bottom wall, a battery compartment, and the fan assembly, wherein access to the mixing area is via lateral air intake.

2. The blower of claim 1, wherein the vanes are provided in a first array disposed on one sidewall of the housing and a second array disposed on another sidewall of the housing.

3. The blower of claim 2, wherein the first and second arrays are disposed on opposite sides of the bottom wall.

4. The blower of claim 1, wherein the vanes extend along a direction substantially parallel to the tube axis.

5. The blower of claim 1, wherein the vanes are arranged parallel to each other in an array that extends away from the bottom wall in a plane that forms an angle relative to the bottom wall.

6. The blower of claim 5, wherein the array includes at least one portion separated from the bottom wall in which the vanes are not in the plane.

7. The blower of claim 1, wherein the vanes are arranged such that longitudinal lengths of each of the vanes in a corresponding array are parallel to each other, and wherein the vanes in the corresponding array are further arranged such that transverse lengths of each of the vanes are substantially parallel to each other.

8. The blower of claim 7, wherein the longitudinal lengths of the vanes are arranged spaced apart from each other to form a convex shape extending away from the bottom wall.

9. The blower of claim 1, wherein the aperture array is disposed below the handle portion.

10. The blower of claim 1, wherein the vanes are arranged such that a transverse length of the vanes is oriented relative to a plane of the bottom wall to define an angle between about 45 degrees and 80 degrees.

11. An aperture array for a blower, the blower comprising a housing including a handle portion, a top wall and a bottom wall, the blower further including a fan assembly operably coupled to a motor to force air through a blower tube responsive to operation of the motor along a tube axis, the aperture array being provided at a portion of the housing to provide a path for air to the fan assembly, the aperture array comprising a plurality of vanes disposed at a portion of the housing between the top wall and the bottom wall, the vanes being angled downward toward the bottom wall, wherein a mixing area is formed in an area between the aperture array, the top wall, the bottom wall, a battery compartment, and the fan assembly, and wherein access to the mixing area is via lateral air intake.

12. The aperture array of claim 11, wherein the vanes are provided in a first array disposed on one sidewall of the housing and a second array disposed on another sidewall of the housing.

13. The aperture array of claim 12, wherein the first and second arrays are disposed on opposite sides of the bottom wall.

14. The aperture array of claim 11, wherein the vanes extend along a direction substantially parallel to the tube axis.

15. The aperture array of claim 11, wherein the vanes are arranged parallel to each other in an array that extends away from the bottom wall in a plane that forms an angle relative to the bottom wall.

16. The aperture array of claim 15, wherein the array includes at least one portion separated from the bottom wall in which the vanes are not in the plane.

17. The aperture array of claim 10, wherein the vanes are arranged such that longitudinal lengths of each of the vanes in a corresponding array are parallel to each other, and wherein the vanes in the corresponding array are further arranged such that transverse lengths of each of the vanes are substantially parallel to each other.

18. The aperture array of claim 17, wherein the longitudinal lengths of the vanes are arranged spaced apart from each other to form a convex shape extending away from the bottom wall and wherein the aperture array is disposed below the handle portion.

19. The aperture array of claim 11,
wherein the vanes are arranged such that a transverse length of the vanes is oriented relative to a plane of the bottom wall to define an angle between about 45 degrees and 80 degrees.

20. A blower comprising:
a housing including a handle portion, a top wall, and a bottom wall;
a motor;
a fan assembly operably coupled to the motor to force air through a blower tube responsive to operation of the motor, the blower tube defining a tube axis; and
an aperture array provided at a portion of the housing to provide a path for air to the fan assembly, the aperture array being defined by a plurality of vanes disposed at a portion of the housing between the top wall and the bottom wall, the vanes being angled downward relative to the handle portion, wherein the vanes are provided in a first array disposed on one sidewall of the housing and a second array disposed on another sidewall of the housing, and wherein the fan assembly is coaxial with the tube axis of the blower tube.

* * * * *